US011622404B2

United States Patent
Morris et al.

(10) Patent No.: US 11,622,404 B2
(45) Date of Patent: Apr. 4, 2023

(54) RELIABLE WIRELESS COMMUNICATION WITH A SOURCE USING RELAYED COMMUNICATION

(71) Applicant: QUALCOMM Incorporated, San Diego, CA (US)

(72) Inventors: Paul John Morris, Cambridge (GB); Paul Dominic Hiscock, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/168,877

(22) Filed: Feb. 5, 2021

(65) Prior Publication Data

US 2021/0235528 A1    Jul. 29, 2021

Related U.S. Application Data

(63) Continuation of application No. 15/957,332, filed on Apr. 19, 2018, now Pat. No. 10,917,930.

(51) Int. Cl.
*H04W 76/15* (2018.01)
*H04W 36/00* (2009.01)
(Continued)

(52) U.S. Cl.
CPC .......... *H04W 76/15* (2018.02); *H04B 17/309* (2015.01); *H04W 36/0088* (2013.01);
(Continued)

(58) Field of Classification Search
None
See application file for complete search history.

(56) References Cited

U.S. PATENT DOCUMENTS 9,906,276 B2   2/2018   Lee et al.
10,264,038 B2  4/2019   Kafle et al.
(Continued)

FOREIGN PATENT DOCUMENTS

CN    106101901 A    11/2016
CN    106535081 A     3/2017
(Continued)

OTHER PUBLICATIONS

International Search Report and Written Opinion—PCT/US2019/026090—ISA/EPO—dated Jul. 3, 2019.
(Continued)

*Primary Examiner* — Robert M Morlan
(74) *Attorney, Agent, or Firm* — Qualcomm Incorporated

(57) ABSTRACT

This disclosure provides systems, methods and apparatus, including computer programs encoded on computer storage media for reliable communication between a source device, and two or more sink devices. In one aspect, a sink device closest in proximity to the source device can establish a wireless data transfer with the source device. In another aspect, the sink device having the more favorable radio channel conditions can establish a wireless data transfer with the source device. In some aspects, the sink devices can forward audio data received from the source device over a secondary communication link. The audio data can be forwarded to the other sink device automatically, or upon request from the other sink device. The secondary communication link can be implemented as a magnetic communication link, or as a Bluetooth communication link.

18 Claims, 11 Drawing Sheets

(51) Int. Cl.
  *H04W 88/04* (2009.01)
  *H04B 17/309* (2015.01)
  *H04W 88/06* (2009.01)
  *H04W 4/80* (2018.01)
  *H04W 24/06* (2009.01)

(52) U.S. Cl.
  CPC .............. *H04W 88/04* (2013.01); *H04W 4/80* (2018.02); *H04W 24/06* (2013.01); *H04W 88/06* (2013.01)

(56) References Cited

U.S. PATENT DOCUMENTS

| | | |
|---|---|---|
| 10,432,260 B1 | 10/2019 | Kroekenstoel et al. |
| 10,485,049 B1 * | 11/2019 | Batta .................... H04R 1/1016 |
| 10,917,930 B2 | 2/2021 | Morris et al. |
| 2012/0058727 A1 | 3/2012 | Cook et al. |
| 2013/0281016 A1 | 10/2013 | Mcfarthing |
| 2014/0280440 A1 | 9/2014 | Pelly et al. |
| 2015/0382098 A1 | 12/2015 | Aita |
| 2017/0180843 A1 | 6/2017 | Perianu et al. |
| 2017/0311105 A1 | 10/2017 | Hariharan et al. |
| 2018/0084456 A1 | 3/2018 | Gostev et al. |
| 2019/0044576 A1 | 2/2019 | Thoen et al. |
| 2019/0141636 A1 | 5/2019 | Younis |
| 2019/0191246 A1 | 6/2019 | Born |
| 2020/0053611 A1 | 2/2020 | Jorgovanovic et al. |

FOREIGN PATENT DOCUMENTS

| | | |
|---|---|---|
| CN | 107145330 A | 9/2017 |
| CN | 107318062 A | 11/2017 |
| CN | 107894881 A | 4/2018 |
| WO | 2016090120 | 6/2016 |

OTHER PUBLICATIONS

PC Magazine Encyclopedia, "Definition of Radio" Internet Archive, Dec. 1, 2015, 4 pages.

Taiwan Search Report—TW108112118—TIPO—dated Apr. 25, 2022.

* cited by examiner

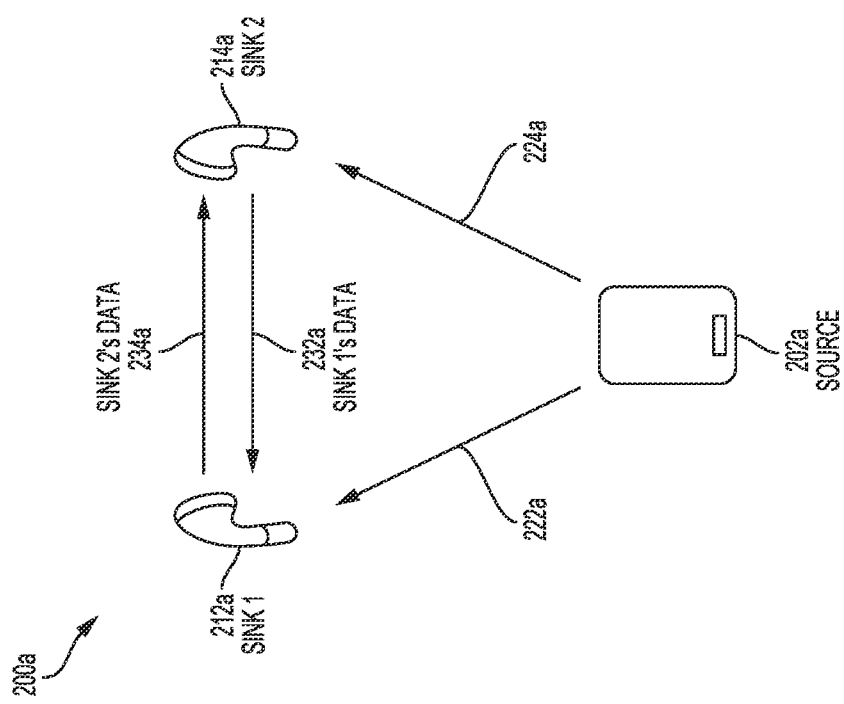

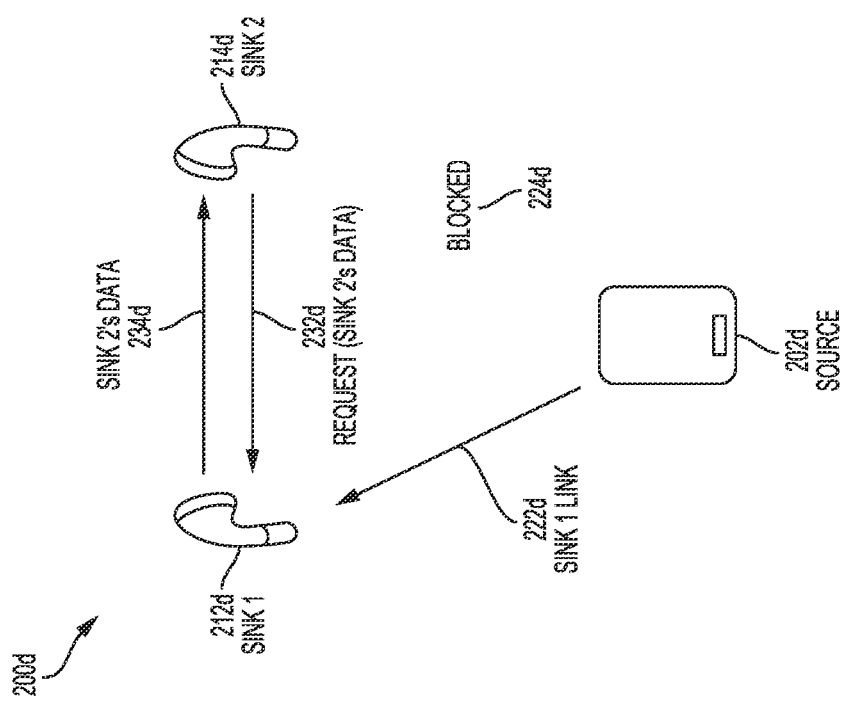

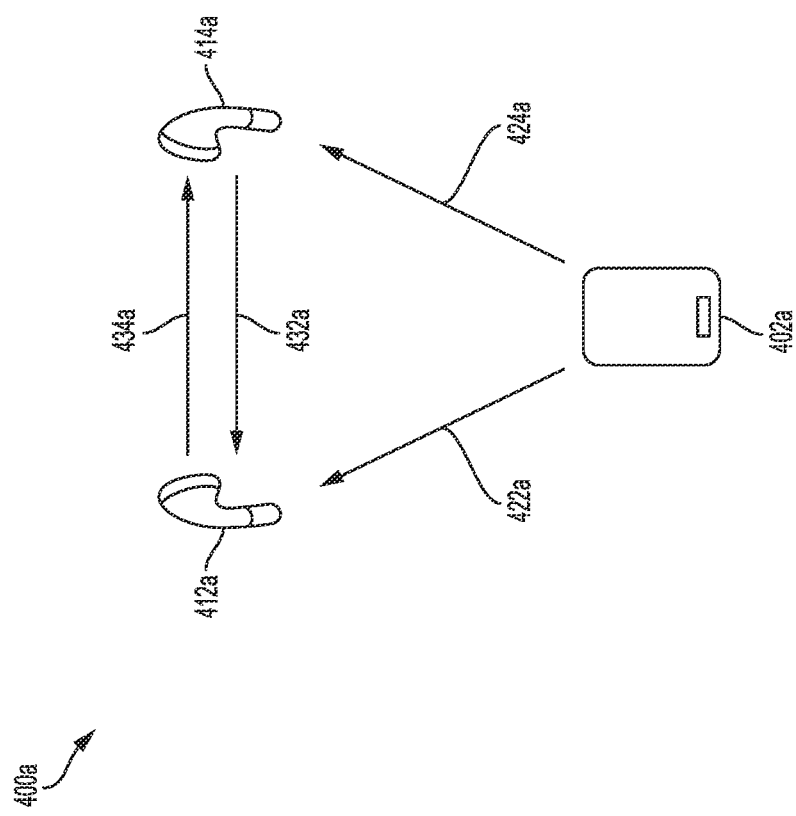

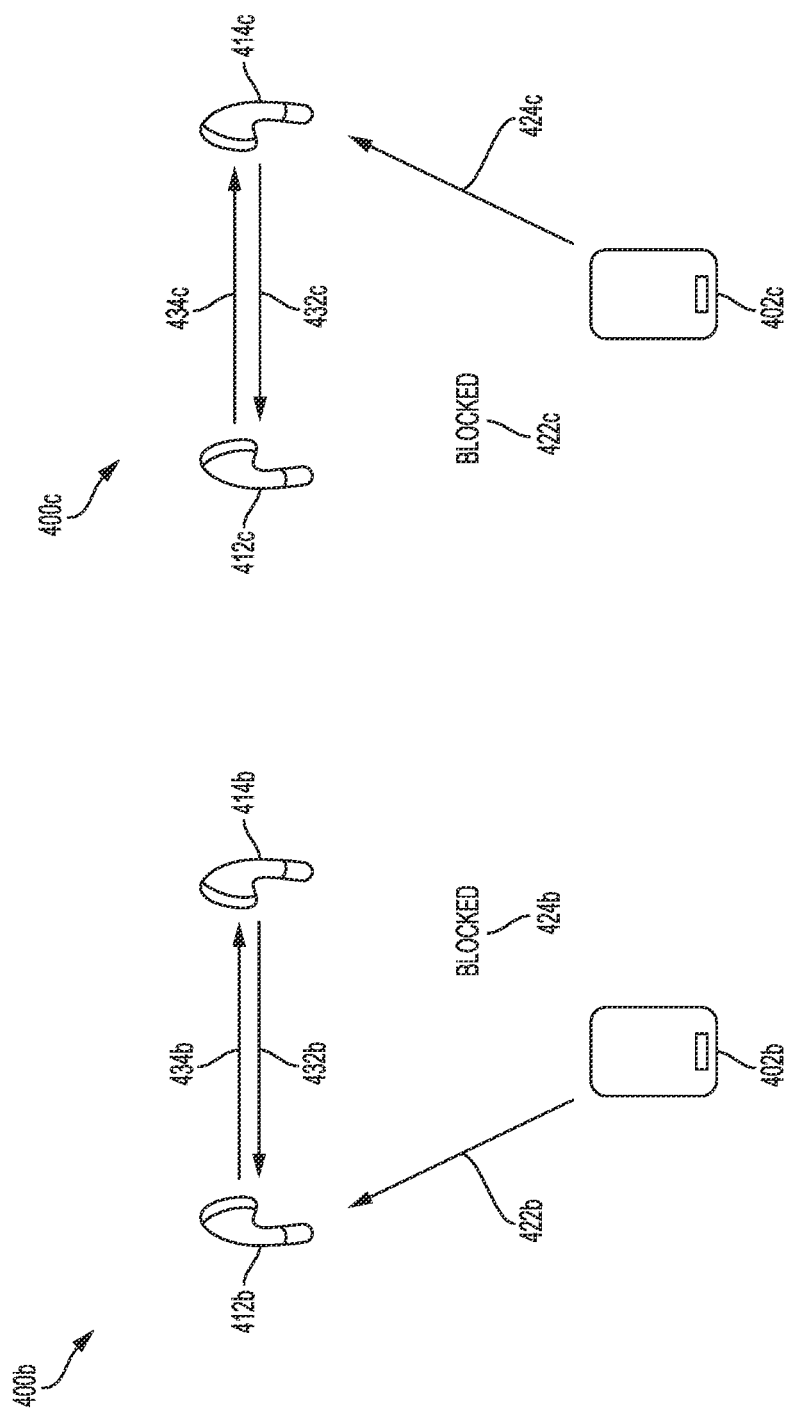

RELIABLE WIRELESS COMMUNICATION WITH A SOURCE USING RELAYED COMMUNICATION

PRIORITY

The present Application for Patent is a continuation of patent application Ser. No. 15/957,332 entitled "RELIABLE WIRELESS COMMUNICATION WITH A SOURCE USING RELAYED COMMUNICATION" filed Apr. 19, 2018, pending, and assigned to the assignee hereof and hereby expressly incorporated by reference herein.

TECHNICAL FIELD

This disclosure relates generally to communications between electronic devices, and more particularly to reliable wireless communication between electronic devices.

DESCRIPTION OF THE RELATED TECHNOLOGY

Advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions, or that perform functions faster, more efficiently or more reliably are often sought after.

A wireless communication device may make use of one or more wireless communication technologies. For example, a wireless communication device may communicate using Bluetooth technology. A Bluetooth-enabled device may send and receive audio data to other Bluetooth-enabled devices. For example, a smartphone may send and receive one or more audio streams to a pair of Bluetooth stereo earbuds (i.e., no wire between the ears). As Bluetooth stereo earbuds, and their associated antennas, decrease in size, the reliability of the audio stream may suffer. As Bluetooth stereo earbuds increase in popularity, it is desirable to improve the reliability of the audio stream while allowing for smaller earbud designs.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of communication between a source device and a plurality of sink devices. The method includes establishing a wireless data transfer between the source device and a first sink device, where the first sink device is dynamically selected from the plurality of sink devices; receiving, at the first sink device, audio data from the source device, where the audio data includes first data intended for the first sink device, and second data intended for a second sink device; and sending, from the first sink device, the second data to the second sink device.

In some implementations, sending the second data to the second sink device occurs over a magnetic communication link. In some implementations, the magnetic communication link is one of a near ultra-low energy field (NULEF) communication link or near field magnetic induction (NFMI) communication link. In some other implementations, sending the second data to the second sink device occurs over a Bluetooth communication link.

In some implementations, sending the second data to the second sink device occurs automatically. In some other implementations, sending the second data to the second sink device is in response to a request from the second sink device.

In some implementations, dynamically selecting the first sink device from the plurality of sink devices includes determining that the first sink device is more proximate to the source device than the second sink device. In some other implementations, dynamically selecting the first sink device from the plurality of sink devices includes determining that radio channel conditions between the source device and the first sink device are more favorable than other radio channel conditions between the source device and the second sink device.

In some implementations, while the first sink device receives the audio data from the source device, the second sink device passively listens in on the wireless data transfer between the source device and the first sink device.

In some implementations, the method further includes establishing a wireless data transfer between the second sink device and the source device; receiving, at the second sink device, the audio data from the source device, where the audio data includes the first data intended for the first sink device, and the second data intended for the second sink device; and sending, from the second sink device, the first data to the first sink device. In some implementations, while the second sink device receives the audio data from the source device, the first sink device passively listens in on the wireless data transfer between the source device and the second sink device.

In some implementations, the source device is one of a smartphone, a mobile device, a laptop computer, a tablet device, a wearable device, an Internet of Things (IoT) device, an Internet of Everything (IoE) device, an IoT hub, or an IoE hub. In some implementations, the first sink device and the second sink device are earbuds.

Another innovative aspect of the subject matter described in this disclosure can be implemented in a first sink device, of a plurality of sink devices, in wireless communication with a source device. The first sink device includes a processor, and a memory in electronic communication with the processor. The first sink device includes instructions stored in the memory and operable, when executed by the processor, to cause the first sink device to establish a wireless data transfer session with the source device, where the first sink device is dynamically selected from the plurality of sink devices; receive audio data from the source device, where the audio data includes first data intended for the first sink device, and second data intended for a second sink device of the plurality of sink devices; and send the second data to the second sink device.

In some implementations, sending the second data to the second sink device occurs over a magnetic communication link. In some implementations, the magnetic communication link is one of a near ultra-low energy field (NULEF) communication link or near field magnetic induction (NFMI) communication link. In some other implementations, sending the second data to the second sink device occurs over a Bluetooth communication link.

In some implementations, sending the second data to the second sink device occurs automatically. In some other implementations, sending the second data to the second sink device is in response to a request from the second sink device.

In some implementations, dynamically selecting the first sink device from the plurality of sink devices includes determining that the first sink device is more proximate to the source device than the second sink device. In some other implementations, dynamically selecting the first sink device from the plurality of sink devices includes determining that radio channel conditions between the source device and the first sink device are more favorable than other radio channel conditions between the source device and the second sink device.

In some implementations, while the first sink device receives the audio data from the source device, the second sink device passively listens in on the wireless data transfer between the source device and the first sink device.

In some implementations, the first sink device can monitor a wireless data transfer session between the second sink device and the source device, where the audio data including the first data intended for the first sink device, and the second data intended for the second sink device, is received by the second sink device; and receive the first data from the second sink device. In some implementations, the first sink device receives the first data from the second sink device over one of a magnetic communication link, or a Bluetooth communication link.

Additionally, the first sink device can be implemented to perform any of the aspects of the innovative method described above.

Another innovative aspect of the subject matter described in this disclosure can be implemented in a non-transitory computer-readable medium including processor-executable program code configured to cause a processor of a first sink device to establish a wireless data transfer between a source device and the first sink device, where the first sink device is dynamically selected from a plurality of sink devices; receive audio data from the source device, where the audio data includes first data intended for the first sink device, and second data intended for a second sink device; and send the second data to the second sink device.

In some implementations, sending the second data to the second sink device occurs over a magnetic communication link. In some implementations, the magnetic communication link is one of a near ultra-low energy field (NULEF) communication link or near field magnetic induction (NFMI) communication link. In some other implementations, sending the second data to the second sink device occurs over a Bluetooth communication link.

In some implementations, sending the second data to the second sink device occurs automatically. In some other implementations, sending the second data to the second sink device is in response to a request from the second sink device.

In some implementations, the processor is further capable of executing processor-executable program code to cause the first sink device to monitor a wireless data transfer session between the second sink device and the source device, where the audio data including the first data intended for the first sink device, and the second data intended for the second sink device, is received by the second sink device; and receive the first data from the second sink device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example topology of a source device communicating with two sink devices.

FIG. 2D shows another example topology of a source device communicating with a first sink device.

FIG. 4A shows an example topology of a source device communicating with two sink devices.

FIG. 4B shows an example topology of a source device communicating with a first sink device.

FIG. 4C shows an example topology of a source device communicating with a second sink device.

Like reference numbers and designations in the various drawings indicate like elements.

DETAILED DESCRIPTION

Figures 1A, 1B:
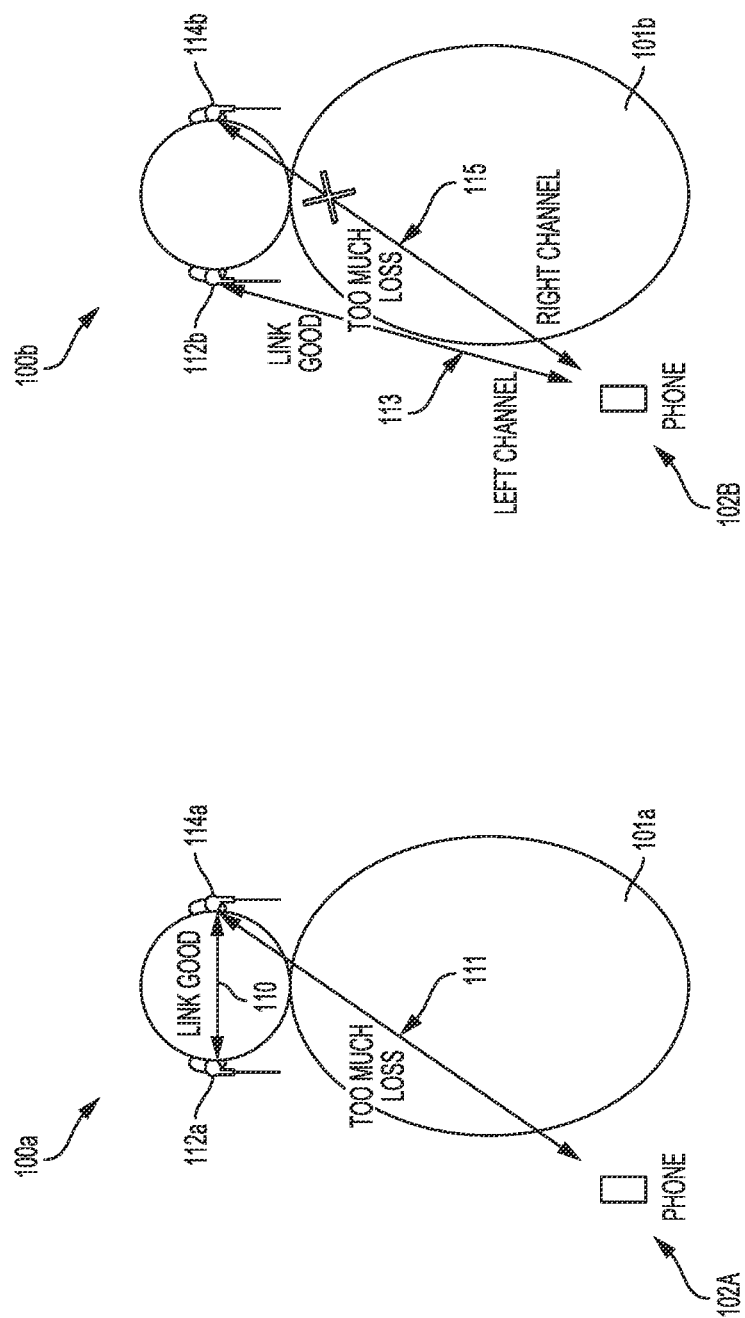
FIG. 1A depicts an example of a user experiencing cross-body interference using first generation true wireless Bluetooth stereo earbuds.
FIG. 1B depicts an example of a user experiencing cross-body interference using second generation true wireless Bluetooth stereo earbuds.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein relate to devices methods, systems, and apparatuses supporting wireless communication between an electronic source device and one or more electronic sink devices. As described herein, the electronic source device can be implemented in a wide variety of designs, having varying degrees of form factors and functionalities, all of which including the ability to transmit and receive data, including audio data, wirelessly. The electronic sink devices also can be implemented in a wide variety of designs, and including the ability to transmit and receive data wirelessly. In one such implementation, the electronic source device is a smartphone, and the electronic sink devices are Bluetooth-enabled wireless earbuds. In particular, the earbuds can be implemented as Bluetooth-enabled true wireless stereo (TWS) earbuds, where the earbuds can communicate wirelessly with one another, and with the electronic source device.

In first generation TWS earbud designs, the smartphone is preconfigured to connect to one particular earbud of the pair, often known as the master device, while the other earbud is known as the slave device. In this first generation TWS topology, the master device earbud establishes a connection, or data transfer, with the smartphone, and relays audio data to the slave device earbud. In second generation TWS earbud designs, the smartphone is configured to connect separately with each of the earbuds.

TWS earbuds of both generations sometimes struggle to receive, and maintain, a reliable audio stream from the smartphone. This problem is exacerbated as Bluetooth-related radios and antennas decrease in size to meet consumer demands for smaller form factors in such devices. Additionally, TWS earbud designs sometimes suffer with the so-called "cross-body problem" when the smartphone is placed across, or on the opposite side, of a user's body causing attenuation on the radio link. Combined together, the cross-body attenuation and small antenna size may cause the communication link to drop, or break altogether. The techniques described herein may improve upon these problems by providing a novel mechanism for more reliable audio data streams.

According to the disclosed techniques, the earbud closest in proximity to the smartphone can be implemented to establish a wireless data transfer with the smartphone. A wireless data transfer can include a wireless connection from the smartphone to the earbud over a connection link or communication link, and also can include a connectionless transfer, such as a broadcast sent from the smartphone. Throughout the disclosure, descriptions related to a wireless connection, or a connectionless broadcast, include data transfers using wireless communication technology. In some implementations, the earbud with the clearest radio channel conditions can establish a wireless data transfer with the smartphone. Determining which earbud has the clearest wireless connection, or more favorable radio communication conditions, can be evaluated based on the earbud having the strongest Received Signal Strength Indication (RSSI) characteristic, receipt of protocol acknowledgements, or the least amount of interference (such as by determining which earbud has the fewest cyclic redundancy check (CRC) errors), or least amount of attenuation measured between the smartphone and the earbud. Upon establishing the wireless data transfer with the preferred, or first, earbud the smartphone can commence transmitting audio data. The audio data can include stereo audio data, such as left and right channel data. At other times, the audio data might include audio received from a phone call, or the voice of a virtual assistant such as Alexa®, Ski® or Cortana®, for example. In some implementations, for comfort, such mono voice data streams can be sent to both earbuds, i.e., placed somewhere in the stereo transmission. In some Bluetooth-compatible implementations, the stereo audio data can be broadcast such that it can be received by both earbuds under good radio conditions and by at least one earbud under poor radio conditions. In some second generation implementations, the second earbud can be configured to monitor, or sniff, the wireless data transfer with the first earbud, and to extract the stereo audio data intended for the second earbud.

Additionally, the disclosed techniques describe a mechanism whereby the earbuds exchange audio data between one another. In particular, a first earbud can be implemented to relay audio data to a second earbud. In some implementations, the first earbud can relay the audio data to the second earbud automatically. In some other implementations, the first earbud can relay the audio data to the second earbud upon receiving a request to relay the audio data from the second earbud. The second earbud also can be implemented to relay audio data to the first earbud, either automatically, or after receiving a request from the first earbud. In some implementations, the audio data can be relayed between the first and second earbuds using a magnetic communication link between the devices. In some other implementations, the audio data can be relayed between the first and second earbuds using a Bluetooth secondary communication link between the devices.

Particular implementations of the subject matter described in this disclosure can be implemented to realize one or more of the following potential advantages. The ability to dynamically select and connect to the most proximate earbud is advantageous over known designs which predesignate a particular earbud as the master device. Additionally, the ability to dynamically select and connect to the earbud with the favorable radio channel conditions is another marked advantage over known preconfigured wireless connection solutions. Exchanging audio data between the earbuds over a magnetic communication link may reduce the overall power consumption of the earbuds, thus prolonging battery life. Moreover, exchanging audio data over a magnetic communication link, which is less prone to interference or disruption over relatively small distances, particularly when passing through body tissues, may result in more reliable audio communication. Also, using magnetic communication links for ear-to-ear communication also may simplify the antenna design of the Bluetooth antenna, which can then be solely concerned with communicating with the electronic audio source device. Finally, exchanging audio data between the earbuds over a Bluetooth secondary communication link may enable cheaper designs, as only a single Bluetooth radio and antenna is required for each of the earbuds. Overall, this may lead to a more robust system whereby the smartphone or other electronic audio source device can be placed in a wider range of locations, such as inside pockets, or at either any side of the body, whilst still maintaining a reliable audio connection.

FIG. 1A depicts an example of a user experiencing cross-body interference 100a using first generation true wireless Bluetooth stereo earbuds. The user 101a is operating a source device, such as an electronic device 102*a* capable of wireless communication. The electronic device 102*a* is communicating with one or more sink devices, such as earbuds 112*a*, 114*a*. In this depicted first generation true wireless Bluetooth stereo earbuds example, the electronic device 102*a* establishes a wireless data transfer 111 with the earbud 114*a*. The earbud 114*a* then establishes a connection link 110 with the earbud 112*a*, and can begin relaying an audio data stream to the earbud 112*a*. When the user 101*a* moves the electronic device 102*a* to the left side of his body away from the earbud 114*a*, such as moving the electronic device 102*a* into his clothing pocket, the wireless data transfer 111 to the earbud 114*a* may be attenuated, or even broken, due to the user's 101*a* body causing cross-body interference with the wireless data transfer 111.

FIG. 1B depicts an example of a user experiencing cross-body interference 100*b* using second generation true wireless Bluetooth stereo earbuds. The user 101*b* is operating a source device, such as an electronic device 102*b* capable of wireless communication. The electronic device 102*b* is communicating with one or more sink devices, such as earbuds 112*b*, 114*b*. In this depicted second generation true wireless Bluetooth stereo earbuds example, the electronic device 102*a* establishes separate wireless data transfers with the earbuds 112*b* and 114*b*, and can send and receive audio data streams over the left channel wireless connection 113 to the earbud 112*b* and over the right channel wireless connection 115 to the earbud 114*b*, respectively. When the user 101*b* moves the electronic device 102*b* to the left side of his body away from the earbud 114*b*, such as moving the electronic device 102*b* into his clothing pocket, the wireless connection 113 with the earbud 112*b* may remain in force, while the wireless connection 115 with the earbud 114*b* may be attenuated, or even broken, due to the user's 101*b* body causing cross-body interference with the wireless connection 115. A person having ordinary skill in the art will readily recognize that when the user 101*b* moves the electronic device 102*b* to the right side of his body, the wireless connection 115 with the earbud 114*b* may remain in force, while the wireless connection 113 with the earbud 112*b* may be attenuated, or even broken due to cross-body interference.

A source device, which can be implemented to originate and transmit data to one or more sink devices, also may be known as an electronic device. An electronic device also may be referred to as a smartphone, a mobile device, wireless device, a remote device, a handheld device, or a subscriber device, or some other suitable terminology, where the "device" also may be referred to as a unit, a station, a terminal, or a client. The electronic device may be implemented as any computing device configured to receive, process and otherwise handle communications, including audio or visual or audio/visual (i.e., video), over a communications network. The electronic device also may be a cellular phone, a personal digital assistant (PDA), a laptop or laptop computer, a tablet device, a personal computer, a gaming console, a virtual or augmented reality device, a drone, an Internet of Things (IoT) device, or other electronic system. IoT devices also may be referred to as an Internet of Everything (IoE) device, an IoT hub, and IoE hub, or any other physical device, vehicle, or home appliance that is embedded with electronics and network connectivity, which enable these objects to connect and exchange data. The IoT device also may be referred to as a virtual assistant device, such as Amazon Alexa®, Google Home®, etc., a wearable device, such as smart watches, Google Glass®, etc., an in-vehicle entertainment or communication system, a home security system, or any device having an interface, such as a network interface, to a communications network and suitable input and output devices. Wearable devices also may be referred to as wearable technology, wearable gadgets, wearables, or some other suitable terminology, which generally describes electronics and software-based technology that is worn on the body, either as an accessory, or as part of material used in clothing.

A sink device, or destination device, can be implemented to receive data over a communications medium from one or more source devices. Electronic devices, as described above, also can be implemented as sink devices. In addition, wearable devices, including earbuds, such as Apple AirPods®, Bose SoundSport®, Philips True Wireless®, Samsung Gear®, as well as wireless headphones can be implemented as sink devices.

The wireless connections 110, 111, 113 and 115, or otherwise known as wireless data transfers, can occur over any suitable communication network that enables devices to communicate with one another over a communication medium. Examples of protocols that can be used to form communication networks can include, near-field communication (NFC) technology, radio-frequency identification (RFID) technology, Bluetooth, Bluetooth Low Energy (BLE), Zigbee, or Wi-Fi (i.e., Institute of Electrical and Electronics Engineers (IEEE) 802.11) technology, the Internet Protocol ("IP"), Transmission Control Protocol ("TCP"), User Datagram Protocol ("UDP"), device-to-device (D2D) protocols, long-term evolution direct (LTE-D), narrow band Internet of Things (NB-IoT), LTE category M (LTE CAT-M), Vehicle to X (V2X), or other such types of protocols described throughout this disclosure. The smartphones 102*a* and 102*b* can be implemented to communicate directly or indirectly with the earbuds 112*a*, 114*a*, and 112*b*, 114*b*, respectively, using communication protocols provided by one or more of these example communication networks. For example, the smartphone 102*a* can communicate with the earbud 114*a* over Bluetooth. Additionally, the earbuds 112*a*, 114*a* and 112*b*, 114*b* can be implemented to communicate with each other using communication protocols provided by one or more of these example communication networks. For example, the earbud 114*a* can communicate with the earbud 112*a* using Bluetooth master and slave topology.

FIG. 2A shows an example topology 200*a* of a source device communicating with two sink devices. The source device, or electronic device 202*a* can be implemented to communicate wirelessly with two sink devices, or two earbuds 212*a*, 214*a*. In some implementations, the electronic device 202*a* can broadcast an audio data stream to be received by the earbuds 212*a*, 214*a*. The broadcasted audio data stream can include stereo audio data for both the earbud 212*a* and the earbud 214*a*. The stereo audio data can, for example, include left and right channel audio signals intended for the respective earbuds 212*a*, 214*a*. The earbuds 212*a*, 214*a* can be implemented to forward the stereo audio data intended for the other earbud to the other earbud. In some implementations, the stereo audio data can be forwarded to the other earbud automatically, while in some other implementations, the stereo audio data can be forwarded upon receiving a forward request from the other earbud. For example, upon receiving the broadcasted stereo audio data for both earbud 212*a* and earbud 214*a*, the earbud 212*a* will forward, or otherwise relay, the stereo audio data intended for earbud 214*a* over a wireless communication link 234*a*. Similarly, upon receiving the broadcasted stereo audio data for both earbud 212*a* and earbud 214*a*, the earbud 214*a* will forward, or otherwise relay, the stereo audio data intended for earbud 212a over a wireless communication link 232a. This forwarding implementation ensures that the earbuds 212a, 214a receive the stereo audio data even if the broadcasted audio data stream is interrupted or broken.

In some other implementations, the electronic device 202a can transmit an audio data stream in two separate links to the earbuds 212a, 214a, over the communication links 222a, 224a, respectively. The transmitted audio data stream can include stereo audio data for both earbud 212a and earbud 214a. The earbuds 212a, 214a can be implemented to forward the stereo audio data intended for the other earbud to the other earbud. In some implementations, the stereo audio data can be forwarded to the other earbud automatically, while in some other implementations, the stereo audio data can be forwarded upon receiving a forward request from the other earbud. For example, upon receiving the stereo audio data for both earbud 212a and earbud 214a over the communication link 222a, the earbud 212a will forward, or otherwise relay, the stereo audio data intended for earbud 214a over a wireless communication link 234a. Similarly, upon receiving stereo audio data for both earbud 212a and earbud 214a over the communication link 224a, the earbud 214a will forward, or otherwise relay, the stereo audio data intended for earbud 212a over a wireless communication link 232a. This forwarding implementation ensures that the earbuds 212a, 214a receive the stereo audio data even if one of the communication links 222a or 224a is interrupted or broken.

In some further implementations, the electronic device 202a can transmit a single audio data stream to either the earbud 212a or the earbud 214a, depending on the radio conditions associated with the respective communication links 222a, 224a, while the other earbud can be implemented to passively listen to the transmitted audio data stream. For example, the electronic device 202a can transmit an audio data stream including stereo audio data for both earbuds 212a, 214a over the communication link 222a to the earbud 212a when the radio conditions over the communication link 222a are more favorable than the radio conditions over the communication link 224a to the earbud 214a. Favorable conditions may be evaluated based on the strongest RSSI characteristic, the fewest CRC errors, receipt of protocol acknowledgements, lower interference, or less static or signal attenuation over the selected communications link. The earbud 214a can be implemented to passively listen, monitor, eavesdrop, or otherwise "sniff" the stereo audio data being transmitted over the communication link 222a to the earbud 212a. In such an implementation, the earbud 214a can obtain the stereo audio data intended for the earbud 214a even though the electronic device 202a only transmitted the audio data stream to the earbud 212a.

Conversely, the electronic device 202a can transmit an audio data stream including stereo audio data for both earbuds 212a, 214a over the communication link 224a to the earbud 214a when the radio conditions over the communication link 224a are more favorable than the radio conditions over the communication link 222a to the earbud 212a. The earbud 212a can be implemented to passively listen, monitor, eavesdrop, or otherwise sniff the stereo audio data being transmitted over the communication link 224a to the earbud 214a. In such an implementation, the earbud 212a can obtain the stereo audio data intended for the earbud 212a even though the electronic device 202a only transmitted the audio data stream to the earbud 214a.

A person having ordinary skill in the art will readily recognize that one sink device can sniff data from another sink's connection to the source device by exchanging the following information between the two sinks: the 128-bit Bluetooth link key; the adaptive frequency hopping (AFH) pattern; and the timestamp when the hopping pattern repeats, and then synchronizing its receiver with the hopping patterns of the other sink. Once synchronized, the link key can be loaded and the data stream can be identified and decoded, including decoding the stereo codec stream to extract a left or right audio channel, as needed.

In implementations where one earbud is unable to sniff the audio data stream transmitted to the other earbud, the receiving earbud can be implemented to forward the stereo audio data to the other earbud. For example, when the electronic device 202a transmits stereo audio data for both earbuds 212a, 214a over the communication link 222a to the earbud 212a, and the earbud 214a is unable to passively listen, monitor, eavesdrop, or otherwise sniff the transmitted stereo audio data, the earbud 212a can be implemented to automatically forward, or otherwise relay, the stereo audio data intended for the earbud 214a to the earbud 214a. Alternatively, the earbud 212a can be implemented to forward, or otherwise relay, the stereo audio data intended for the earbud 214a upon receiving a forwarding request from the earbud 214a. A person having ordinary skill in the art will readily recognize that with the roles reversed, the earbud 214a can be implemented to automatically forward, or forward upon a request from the earbud 212a, the stereo data intended for the earbud 212a.

Figures 2B, 2C:
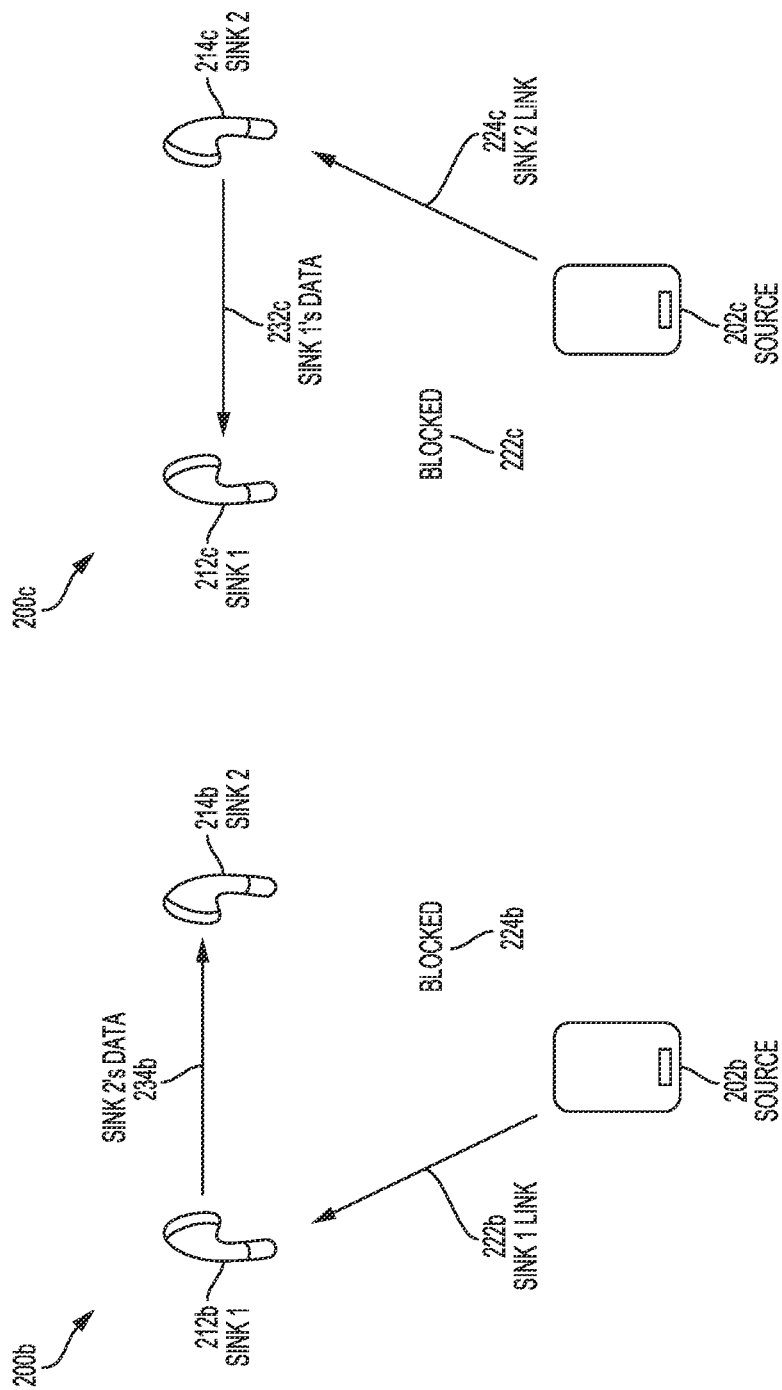
FIG. 2B shows an example topology of a source device communicating with a first sink device.
FIG. 2C shows an example topology of a source device communicating with a second sink device.

FIG. 2B shows an example topology 200b of a source device communicating with a sink device. The source device, or electronic device 202b, can be implemented to select the sink device associated with the more favorable radio communication conditions, or that is closer in proximity to the electronic device 202b. In the depicted example, the communication link 224b between the electronic device 202b and the sink device, the earbud 214b, is blocked. The blocking may be due to interference or other degradation of the communication link 224b. Based on the blocked communication link 224b, the electronic device 202b can be implemented to connect with the other sink device, the earbud 212b, over the more favorable communication link 222b. In some implementations, the electronic device 202b, in combination with one or both of the earbuds 212b, 214b, can be implemented to select the sink device with the more favorable radio communication conditions, or that is closer in proximity to the electronic device 202b. The ability for the electronic device 202b to dynamically select and connect to a sink device based on the radio conditions associated with each sink device is a marked advantage over known solutions, such as those where the source device is preconfigured or predetermined to connect with a particular sink, often known as the master sink. As described throughout, the phrase "based on" does not mean "based only on," unless expressly specified otherwise. In other words, the phrase "based on" describes both "based only on" and "based at least on." Alternatively, the control of which communication link 222b, 224b is selected or maintained may be decided by one or more of the earbuds 212b, 214b. Whilst the electronic device 202b may try to connect to both earbuds 212b, 214b, it may not be able to, as the communication link 224b may be blocked, or only the earbud 212b accepts the connection.

In this depicted example, the electronic device 202b is transmitting an audio data stream including stereo audio data for both the earbuds 212b, 214b over the communication link 222b to the earbud 212b. Similar to the description with respect to FIG. 2A, the earbud 212b can be implemented to process the stereo audio data intended for itself, and to forward the stereo audio data intended for the earbud 214b over a wireless communication link 234b automatically upon receiving the audio data stream from the electronic device 202b.

FIG. 2C shows an example topology 200c of a source device communicating with another sink device. Similar to the description with respect to FIG. 2B, the source device, or electronic device 202c, can be implemented to select the sink device associated with the more favorable radio communication conditions, or that is closer in proximity to the electronic device 202c. In the depicted example, the communication link 222c between the electronic device 202c and the sink device, the earbud 212c, is blocked. The blocking may be due to interference or other degradation of the communication link 222c. Based on the blocked communication link 222c, the electronic device 202c can be implemented to connect with the other sink device, the earbud 214c, over the more favorable communication link 224c. Similar to the description in FIG. 2B, in some implementations, the electronic device 202c, in combination with one or both of the earbuds 212c, 214c, can be implemented to select the sink device with the more favorable radio communication conditions, or that is closer in proximity to the electronic device 202c. Again, the ability for the electronic device 202c to dynamically select and connect to a sink device based on the radio conditions associated with each sink device is a marked advantage over known solutions, such as those where the source device is preconfigured or predetermined to connect with a particular sink, often known as the master sink. Alternatively, the control of which communication link 222c, 224c is selected or maintained may be decided by one or more of the earbuds 212c, 214c. Whilst the electronic device 202c may try to connect to both earbuds 212c, 214c, it may not be able to, as the communication link 222c may be blocked, or only the earbud 214c accepts the connection.

In this depicted example, the electronic device 202c is transmitting an audio data stream including stereo audio data for both the earbuds 212c, 214c over the communication link 224c to the earbud 214c. Similar to the descriptions with respect to FIGS. 2A and 2B, the earbud 214c can be implemented to process the stereo audio data intended for itself, and to forward the stereo audio data intended for the earbud 212c over a wireless communication link 232c automatically upon receiving the audio data stream from the electronic device 202c.

FIG. 2D shows another example topology 200d of a source device communicating with a sink device. Similar to the descriptions with respect to FIGS. 2B and 2C, the source device, or electronic device 202d, can be implemented to select the sink device associated with the more favorable radio communication conditions, or that is closer in proximity to the electronic device 202d. In the depicted example, the communication link 224d between the electronic device 202d and the sink device, the earbud 214d, is blocked. The blocking may be due to interference or other degradation of the communication link 224d. Similar to the description in FIGS. 2B and 2C, in some implementations, the electronic device 202d, in combination with one or both of the earbuds 212d, 214d, can be implemented to select the sink device with the more favorable radio communication conditions, or that is closer in proximity to the electronic device 202d. Based on the blocked communication link 224d, the electronic device 202d can be implemented to connect with the other sink device, the earbud 212d, over the more favorable communication link 222d. Again, the ability for the electronic device 202d to dynamically select and connect to a sink device based on the radio conditions associated with each sink device is a marked advantage over known solutions, such as those where the source device is preconfigured or predetermined to connect with a particular sink, often known as the master sink. Alternatively, the control of which communication link 222d, 224d is selected or maintained may be decided by one or more of the earbuds 212d, 214d. Whilst the electronic device 202d may try to connect to both earbuds 212d, 214d, it may not be able to, as the communication link 224d may be blocked, or only the earbud 212d accepts the connection.

In this depicted example, the electronic device 202d is transmitting an audio data stream including stereo audio data for both the earbuds 212d, 214d over the communication link 222d to the earbud 212d. Different than the descriptions of FIGS. 2B and 2C, the earbud 212d can be implemented to process the stereo audio data intended for itself, and to forward the stereo audio data to the earbud 214d over a wireless communication link 234d only upon receiving a forwarding request from the earbud 214d over a wireless communication link 232d. In such an implementation, power savings can be achieved, as the earbud 212d is not required to automatically forward, send, transmit, or otherwise relay, the stereo audio data to the earbud 214d, and instead only forwards the stereo audio data intended for the earbud 214d upon request from the earbud 214d. The power savings associated with this implementation may come at the expense of a time delay, given that the earbud 214d is first requesting its respective stereo audio data from the earbud 212d.

Figure 3A:
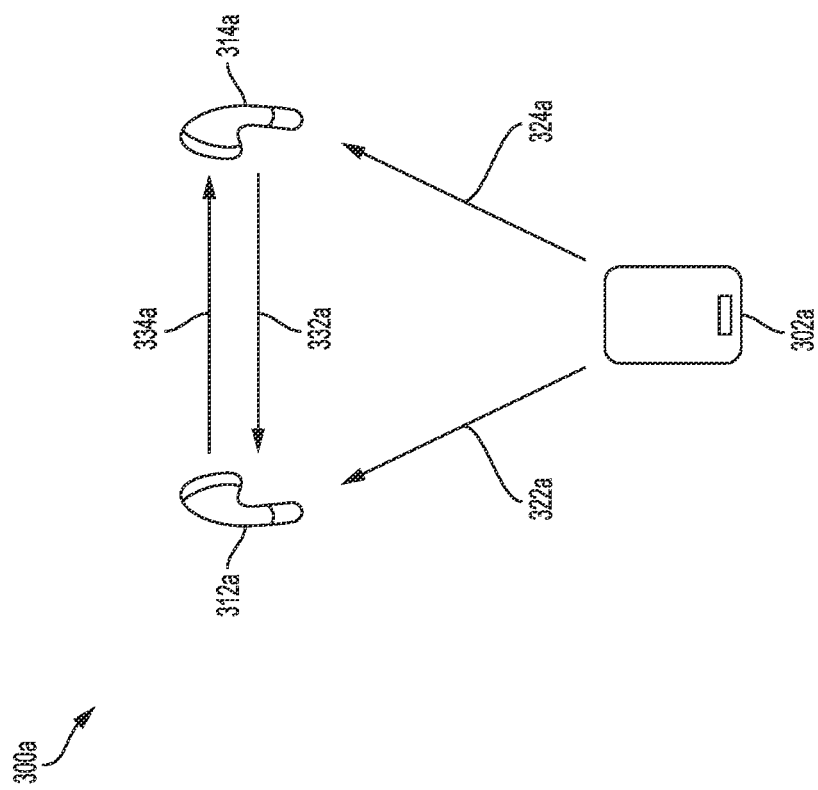
FIG. 3A shows an example topology of a source device communicating with two sink devices.

FIG. 3A shows an example topology 300a of a source device communicating with two sink devices. The source device, or electronic device 302a can be implemented to communicate wirelessly with two sink devices, or two earbuds 312a, 314a. In some implementations, the electronic device 302a can broadcast an audio data stream over Bluetooth to be received by the earbuds 312a, 314a. The broadcasted audio data stream can include stereo audio data for both the earbud 312a and the earbud 314a. The stereo audio data can, for example, include left and right channel audio signals intended for the respective earbuds 312a, 314a. In a good transmission environment, the stereo audio data can be received by both the earbuds 312a, 314a over the Bluetooth communication links 322a, 324a, respectively.

If an interruption, or interference, occurs on either of the Bluetooth communication links 322a, 324a, the earbuds 312a, 314a can be implemented to forward the intended stereo audio data to the other earbud using a magnetic communication link, such as over a near-field communication (NFC), a near-field magnetic induction (NFMI), or a near ultra-low energy field (NULEF) communication link. Magnetic communication links are generally not subject to attenuation from a user's head, body, or other obstruction, and are therefore more reliable over relatively short distances, such as one centimeter (cm) to five meters (m), or more particularly, like one cm to thirty cm for antenna sizes compatible with earbuds. To transmit and receive data over a magnetic communication link, the earbuds 312a, 314a can be implemented to each include a magnetic communication link radio and antenna.

In some implementations, the stereo audio data can be forwarded over a magnetic communication link to the other earbud automatically. For example, upon receiving the broadcasted stereo audio data for both earbud 312a and earbud 314a, the earbud 312a can be implemented to forward, or otherwise relay, the stereo audio data intended for earbud 314a over the magnetic communication link 334a. Similarly, upon receiving the broadcasted stereo audio data for both earbud 312a and earbud 314a, the earbud 314a can be implemented to forward, or otherwise relay, the stereo audio data intended for earbud 312a over the magnetic communication link 332a. This forwarding implementation ensures that the earbuds 312a, 314a receive the stereo audio data even if the broadcasted audio data stream over the Bluetooth communication links 322a, 324a is interrupted or broken.

In some other implementations, the stereo audio data can be forwarded over a magnetic communication link upon receiving a forwarding request over a magnetic communication link from the other earbud. For example, upon receiving the broadcasted stereo audio data for both earbud 312a and earbud 314a, the earbud 312a can be implemented to forward, or otherwise relay, the stereo audio data intended for earbud 314a over the magnetic communication link 334a only upon receiving a forwarding request from the earbud 314a over the magnetic communication link 332a. Similarly, upon receiving the broadcasted stereo audio data for both earbud 312a and earbud 314a, the earbud 314a can be implemented to forward, or otherwise relay, the stereo audio data intended for earbud 312a over the magnetic communication link 332a only upon receiving a forwarding request from the earbud 312a over the magnetic communication link 334a.

In some other implementations, such as in a true wireless stereo (TWS) implementation, the electronic device 302a can establish a separate data transfer with each of the earbuds 312a, 314a. In such an implementation, the electronic device 302a can connect with the earbuds 312a, 314a over two separate Bluetooth communication links 322a, 324a, respectively, where, for example, left channel audio data is transmitted to the earbud 312a and right channel audio data is transmitted to the earbud 314a. The earbuds 312a, 314a can be implemented to establish a secondary connection amongst themselves over the magnetic communication links 332a, 334a.

In anticipation of interruption or interference on the Bluetooth communication links 322a, 324a, or simply to know what data is being sent to the earbud 314a, the earbud 312a can be implemented to passively listen in, monitor, eavesdrop, or otherwise sniff the right channel audio data being transmitted over the Bluetooth communication link 324a to the earbud 314a. The earbud 312a can be implemented to sniff the right channel audio data upon gaining access to the link key and hopping sequence associated with the Bluetooth communication link 324a. In some implementations, the earbud 312a can receive the link key from the earbud 314a upon establishing the magnetic communication link 332a with the earbud 314a. In some implementations, the earbud 312a also can receive the hopping sequence from the earbud 314a upon establishing the magnetic communication link 332a with the earbud 314a. Since the link key and hopping sequence are exchanged between the earbuds 312a, 314a and without involving the electronic device 302a, the earbuds as disclosed herein are compatible with legacy electronic devices. In other words, the electronic device 302a does not require a hardware, software or firmware update to utilize earbuds including the innovative aspects as described in this disclosure.

In some TWS implementations, such as where one earbud is unable to passively listen in on the audio data stream transmitted to the other earbud, the earbuds 312a, 314a can be implemented to automatically forward, or otherwise relay, received audio data to the other earbud over the magnetic communication links 332a, 334a. In some other TWS implementations, again where one earbud is unable to passively listen in on the audio data stream transmitted to the other earbud, the earbuds 312a, 314a can be implemented to forward, or otherwise relay, received audio data to the other earbud upon request over the magnetic communication links 332a, 334a.

Figures 3B, 3C:
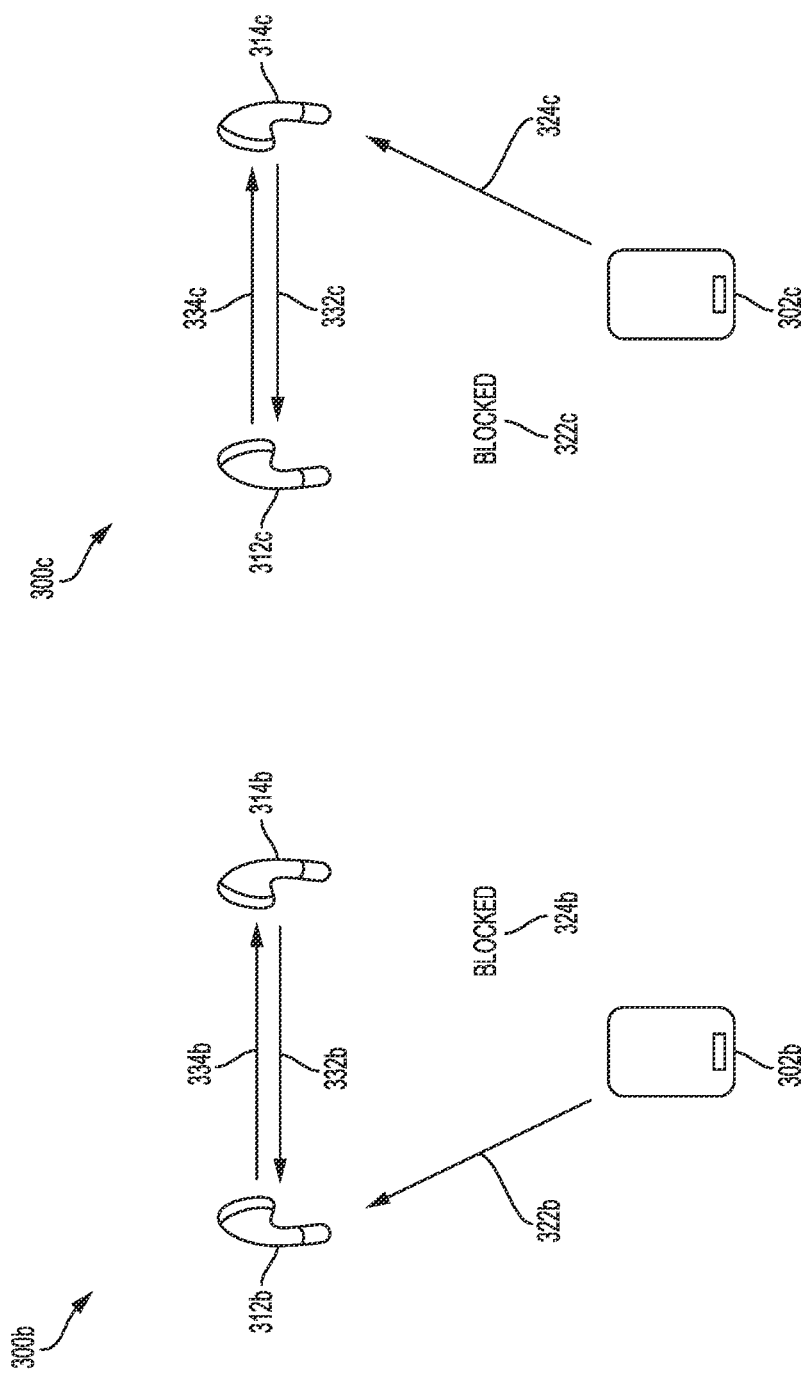
FIG. 3B shows an example topology of a source device communicating with a first sink device.
FIG. 3C shows an example topology of a source device communicating with a second sink device.

FIG. 3B shows an example topology 300b of a source device communicating with a first sink device. In the depicted example, the source device, or the electronic device 302b, is connected to the first sink device, or the earbud 312b, over the Bluetooth communication link 322b. The Bluetooth communication link 324b between the electronic device 302b and the second sink device, or the earbud 314b, is blocked. The blocking may be due to interference or other degradation of the Bluetooth communication link 324b. In some implementations, the blocking may prevent the earbud 314b from passively listening in on the Bluetooth communication link 322b, and therefore the earbud 314b may not receive its intended right channel audio data from the electronic device 302b.

In such implementations, the earbud 314b can detect that the Bluetooth communication link 324b is blocked. The earbud 314b can be implemented to initiate a forwarding request over the magnetic communication link 332b to the earbud 312b requesting the right channel audio data intended for the earbud 314b. Upon receipt of the forwarding request, the earbud 312b can forward, or otherwise relay, the right channel audio data intended for the earbud 314b over the magnetic communication link 334b. In this implementation, since the earbud 314b itself detects the Bluetooth communication link 324b blockage, and requests its intended audio data using the magnetic communication link 332b, neither the earbud 312b, nor the electronic device 302b need to change their configured behaviors. In other words, the electronic device 302b does not require a hardware, software or firmware update to operate with earbuds including the innovative magnetic communication aspects as described in this disclosure.

In other such implementations, the earbud 312b can passively listen in on the attempted connection between the electronic device 302b and the earbud 314b, and detect that the Bluetooth communication link 324b is blocked. The earbud 312b can be implemented to monitor, eavesdrop, or otherwise sniff the right channel audio data intended for the earbud 314b. The earbud 312b also can be implemented to automatically forward the right channel audio data intended for the earbud 314b over the magnetic communication link 334b.

In either implementation, the earbud 314b can obtain the intended audio data, as well as control data, via the secondary connection over the magnetic communication link 334b, despite the Bluetooth communication link 324b being unavailable.

FIG. 3C shows an example topology 300c of a source device communicating with a second sink device. In the depicted example, the source device, or the electronic device 302c, is connected to the second sink device, or the earbud 314c, over the Bluetooth communication link 324c. The Bluetooth communication link 322c between the electronic device 302c and the first sink device, or the earbud 312c, is blocked. The blocking may be due to interference or other degradation of the Bluetooth communication link 322c. In some implementations, the blocking may prevent the earbud 312c from passively listening in on the Bluetooth communication link 324c, and therefore the earbud 312c may not receive its intended left channel audio data from the electronic device 302c.

In such implementations, the earbud 312c can detect that the Bluetooth communication link 322c is blocked. The earbud 312c can be implemented to initiate a forwarding request over the magnetic communication link 334c to the earbud 314c requesting the left channel audio data intended for the earbud 312c. Upon receipt of the forwarding request, the earbud 314c can forward, or otherwise relay, the left channel audio data intended for the earbud 312c over the magnetic communication link 332c. In this implementation, since the earbud 312c itself detects the Bluetooth communication link 322c blockage, and requests its intended audio data using the magnetic communication link 334c, neither the earbud 314c, nor the electronic device 302c need to change their configured behaviors. In other words, the electronic device 302c does not require a hardware, software or firmware update to operate with earbuds including the innovative magnetic communication aspects as described in this disclosure.

In other such implementations, the earbud 314c can passively listen in on the attempted connection between the electronic device 302c and the earbud 312c, and detect that the Bluetooth communication link 322c is blocked. The earbud 314c can be implemented to monitor, eavesdrop, or otherwise sniff the left channel audio data intended for the earbud 312c. The earbud 314c also can be implemented to automatically forward the left channel audio data intended for the earbud 312c over the magnetic communication link 332c.

In either implementation, the earbud 312c can obtain the intended audio data, as well as control data, via the secondary connection over the magnetic communication link 332c, despite the Bluetooth communication link 322c being unavailable.

FIG. 4A shows an example topology 400a of a source device communicating with two sink devices. The source device, or electronic device 402a, can be implemented to communicate wirelessly with two sink devices, or two earbuds 412a, 414a. In some implementations, the electronic device 402a can broadcast an audio data stream over Bluetooth to be received by the earbuds 412a, 414a. The broadcasted audio data stream can include stereo audio data for both the earbud 412a and the earbud 414a. The stereo audio data can, for example, include left and right channel audio signals intended for the respective earbuds 412a, 414a. In a good transmission environment, the stereo audio data can be received by both the earbuds 412a, 414a over the Bluetooth communication links 422a, 424a, respectively.

If an interruption, or interference, occurs on either of the Bluetooth communication links 422a, 424a, the earbuds 412a, 414a can be implemented to forward the intended stereo audio data to the other earbud using a secondary communication link, such as a Bluetooth radio communication link.

In some implementations, the stereo audio data can be forwarded over a Bluetooth secondary communication link to the other earbud automatically. For example, upon receiving the broadcasted stereo audio data for both earbud 412a and earbud 414a, the earbud 412a can be implemented to forward, or otherwise relay, the stereo audio data intended for earbud 414a over the Bluetooth secondary communication link 434a. Similarly, upon receiving the broadcasted stereo audio data for both earbud 412a and earbud 414a, the earbud 414a can be implemented to forward, or otherwise relay, the stereo audio data intended for earbud 412a over the Bluetooth secondary communication link 432a. This forwarding implementation ensures that the earbuds 412a, 414a receive the stereo audio data even if the broadcasted audio data stream over the Bluetooth communication links 422a, 424a is interrupted or broken.

In some other implementations, the stereo audio data can be forwarded over a Bluetooth secondary communication link upon receiving a forwarding request over a Bluetooth secondary communication link from the other earbud. For example, upon receiving the broadcasted stereo audio data for both earbud 412a and earbud 414a, the earbud 412a can be implemented to forward, or otherwise relay, the stereo audio data intended for earbud 414a over the Bluetooth secondary communication link 434a only upon receiving a forwarding request from the earbud 414a over the Bluetooth secondary communication link 432a. Similarly, upon receiving the broadcasted stereo audio data for both earbud 412a and earbud 414a, the earbud 414a can be implemented to forward, or otherwise relay, the stereo audio data intended for earbud 412a over the Bluetooth secondary communication link 432a only upon receiving a forwarding request from the earbud 412a over the Bluetooth secondary communication link 434a.

While the Bluetooth secondary communication link implementations may include added complexity, such as ensuring that the Bluetooth antennas in each of the earbuds 412a, 414a are aligned appropriately, such as pointing down, or down and across, to maintain a connection, which can be challenging in smaller design configurations, the implementations are certainly feasible in larger design configurations. Additionally, the Bluetooth radios associated with each of the earbuds 412a, 414a may need to implement time-domain multiplexing in order to transmit and receive data on the Bluetooth communication links 422a, 424a, as well as on the Bluetooth secondary communication links 432a, 434a, respectively. This may result in additional congestion over the radio link, and may limit the maximum data rates that can be supported in such implementations. Furthermore, power consumption at the earbuds 412a, 414a may be higher in the Bluetooth secondary communication link implementations as compared to the magnetic communication link implementations, as described in FIGS. 3A-3C, which may adversely impact the battery life of the earbuds 412a, 414a. Despite some of these potential drawbacks, the Bluetooth secondary communication link implementations have the advantage that only a single Bluetooth radio and antenna is required for each of the earbuds 412a, 414a, to communicate over the Bluetooth communication links 422a, 424a and the Bluetooth secondary communication links 432a, 434a. Comparatively, in the magnetic communication link implementations, as described in FIGS. 3A-3C, the earbuds 312a, 314a, 312b, 314b, 312c, 314c require a Bluetooth radio and antenna, in addition to a magnetic communication radio and antenna, to communicate over the Bluetooth communication links 322a, 324a, 322b, 324b, 322c, 324c and the magnetic communication links 332a, 334a, 332b, 334b, 332c, 334c, respectively.

In some other implementations, such as in a true wireless stereo (TWS) implementation, the electronic device 402a can establish a separate data transfer with each of the earbuds 412a, 414a. In such an implementation, the electronic device 402a can connect with the earbuds 412a, 414a over two separate Bluetooth communication links 422a, 424a, respectively, where, for example, left channel audio data is transmitted to the earbud 412a and right channel audio data is transmitted to the earbud 414a. The earbuds 412a, 414a can be implemented to establish a secondary connection amongst themselves over the Bluetooth secondary communication links 432a, 434a.

In anticipation of interruption or interference on the Bluetooth communication links 422a, 424a, or simply to know what data is being sent to the earbud 414a, the earbud 412a can be implemented to passively listen in, monitor, eavesdrop, or otherwise sniff the right channel audio data being transmitted over the Bluetooth communication link 424a to the earbud 414a. The earbud 412a can be implemented to sniff the right channel audio data upon gaining access to the link key and hopping sequence associated with the Bluetooth communication link 424a. In some implementations, the earbud 412a can receive the link key from the earbud 414a upon establishing the Bluetooth secondary communication link 432a with the earbud 414a. In some implementations, the earbud 412a also can receive the hopping sequence from the earbud 414a upon establishing the Bluetooth secondary communication link 432a with the earbud 414a. Since the link key and hopping sequence are exchanged between the earbuds 412a, 414a and without involving the electronic device 402a, the earbuds as disclosed herein are compatible with legacy electronic devices. In other words, the electronic device 402a does not require a hardware, software or firmware update to utilize earbuds including the innovative aspects as described in this disclosure.

In some TWS implementations, such as where one earbud is unable to passively listen in on the audio data stream transmitted to the other earbud, the earbuds 412a, 414a can be implemented to automatically forward, or otherwise relay, received audio data to the other earbud over the Bluetooth secondary communication links 432a, 434a. In some other TWS implementations, again where one earbud is unable to passively listen in on the audio data stream transmitted to the other earbud, the earbuds 412a, 414a can be implemented to forward, or otherwise relay, received audio data to the other earbud upon request over the Bluetooth secondary communication links 432a, 434a.

FIG. 4B shows an example topology 400b of a source device communicating with a first sink device. In the depicted example, the source device, or the electronic device 402b, is connected to the first sink device, or the earbud 412b, over the Bluetooth communication link 422b. The Bluetooth communication link 424b between the electronic device 402b and the second sink device, or the earbud 414b, is blocked. The blocking may be due to interference or other degradation of the Bluetooth communication link 424b. In some implementations, the blocking may prevent the earbud 414b from passively listening in on the Bluetooth communication link 422b, and therefore the earbud 414b may not receive its intended right channel audio data from the electronic device 402b.

In such implementations, the earbud 414b can detect that the Bluetooth communication link 424b is blocked. The earbud 414b can be implemented to initiate a forwarding request over the Bluetooth secondary communication link 432b to the earbud 412b requesting the right channel audio data intended for the earbud 414b. Upon receipt of the forwarding request, the earbud 412b can forward, or otherwise relay, the right channel audio data intended for the earbud 414b over the Bluetooth secondary communication link 434b. In this implementation, since the earbud 414b itself detects the Bluetooth communication link 424b blockage, and requests its intended audio data using the Bluetooth secondary communication link 432b, neither the earbud 412b, nor the electronic device 402b need to change their configured behaviors. In other words, the electronic device 402b does not require a hardware, software or firmware update to operate with earbuds including the innovative Bluetooth secondary communication aspects as described in this disclosure.

In other such implementations, the earbud 412b can passively listen in on the attempted connection between the electronic device 402b and the earbud 414b, and detect that the Bluetooth communication link 424b is blocked. The earbud 412b can be implemented to monitor, eavesdrop, or otherwise sniff the right channel audio data intended for the earbud 414b. The earbud 412b also can be implemented to automatically forward the right channel audio data intended for the earbud 414b over the Bluetooth secondary communication link 434b.

In either implementation, the earbud 414b can obtain the intended audio data, as well as control data, via the secondary connection over the Bluetooth secondary communication link 434b, despite the Bluetooth communication link 424b being unavailable.

FIG. 4C shows an example topology 400c of a source device communicating with a second sink device. In the depicted example, the source device, or the electronic device 402c, is connected to the second sink device, or the earbud 414c, over the Bluetooth communication link 424c. The Bluetooth communication link 422c between the electronic device 402c and the first sink device, or the earbud 412c, is blocked. The blocking may be due to interference or other degradation of the Bluetooth communication link 422c. In some implementations, the blocking may prevent the earbud 412c from passively listening in on the Bluetooth communication link 424c, and therefore the earbud 412c may not receive its intended left channel audio data from the electronic device 402c.

In such implementations, the earbud 412c can detect that the Bluetooth communication link 422c is blocked. The earbud 412c can be implemented to initiate a forwarding request over the Bluetooth secondary communication link 434c to the earbud 414c requesting the left channel audio data intended for the earbud 412c. Upon receipt of the forwarding request, the earbud 414c can forward, or otherwise relay, the left channel audio data intended for the earbud 412c over the Bluetooth secondary communication link 432c. In this implementation, since the earbud 412c itself detects the Bluetooth communication link 422c blockage, and requests its intended audio data using the Bluetooth secondary communication link 434c, neither the earbud 414c, nor the electronic device 402c need to change their configured behaviors. In other words, the electronic device 402c does not require a hardware, software or firmware update to operate with earbuds including the innovative Bluetooth secondary communication aspects as described in this disclosure.

In other such implementations, the earbud 414c can passively listen in on the attempted connection between the electronic device 402c and the earbud 412c, and detect that the Bluetooth communication link 422c is blocked. The earbud 414c can be implemented to monitor, eavesdrop, or otherwise sniff the left channel audio data intended for the earbud 412c. The earbud 414c also can be implemented to automatically forward the left channel audio data intended for the earbud 412c over the Bluetooth secondary communication link 432c.

In either implementation, the earbud 412c can obtain the intended audio data, as well as control data, via the secondary connection over the Bluetooth secondary communication link 432c, despite the Bluetooth communication link 422c being unavailable.

Figure 5:
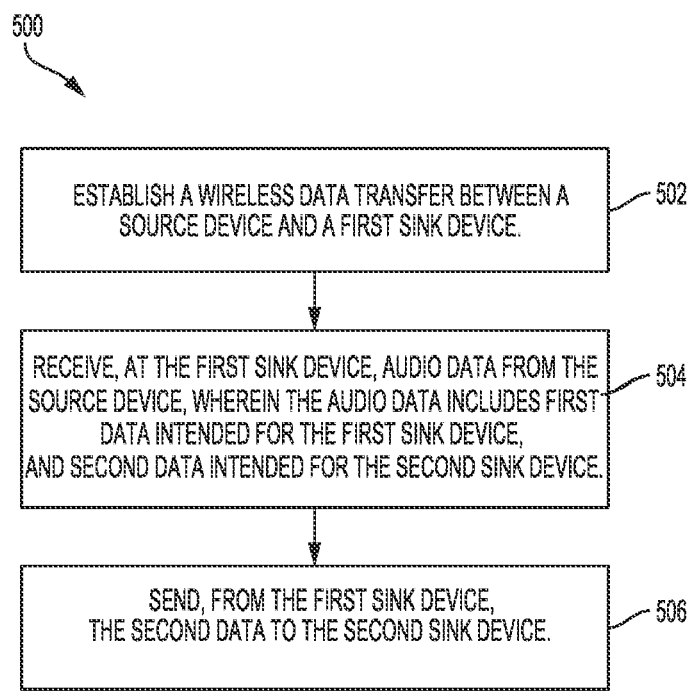
FIG. 5 shows an example method for communication between a source device, a first sink device and a second sink device.

FIG. 5 shows an example method 500 for communicating between a source device and a plurality of sink devices. In some implementations, the plurality of sink devices can include a plurality of available sink devices. The plurality of available sink devices include sink devices capable of communicating with the source device. In some implementations, a first sink device and a second sink device are amongst the plurality of available sink devices. The operations of the method 500 may be implemented by the source devices, or the electronic devices 102a, 102b, 202a, 202b, 202c, 202d, 302a, 302b, 302c, 402a, 402b and 402c, and the first and second sink devices, or, respectively, the earbuds 112a, 114a, 112b, 114b, 212a, 214a, 212b, 214b, 212c, 214c, 212d, 214d, 312a, 314a, 312b, 314b, 312c, 314c, 412a, 414a, 412b, 414b, 412c and 414c, depicted and described in FIGS. 1A-4C, or their components as described throughout.

In some implementations, the described electronic devices 102a, 102b, 202a, 202b, 202c, 202d, 302a, 302b, 302c, 402a, 402b and 402c, and the earbuds 112a, 114a, 112b, 114b, 212a, 214a, 212b, 214b, 212c, 214c, 212d, 214d, 312a, 314a, 312b, 314b, 312c, 314c, 412a, 414a, 412b, 414b, 412c and 414c, may execute a set of codes to control the functional elements of the respective device, or of one or more other devices, to perform the functions described in FIG. 5. Additionally, or alternatively, the described electronic devices 102a, 102b, 202a, 202b, 202c, 202d, 302a, 302b, 302c, 402a, 402b and 402c, and the earbuds 112a, 114a, 112b, 114b, 212a, 214a, 212b, 214b, 212c, 214c, 212d, 214d, 312a, 314a, 312b, 314b, 312c, 314c, 412a, 414a, 412b, 414b, 412c and 414c, may perform aspects of the functions described in FIG. 5 using special-purpose hardware.

A person having ordinary skill in the art will readily recognize that the nomenclature indicating a first sink device and a second sink device can be used interchangeably, and do not necessarily refer to a particular one of the earbuds 112a, 114a, 112b, 114b, 212a, 214a, 212b, 214b, 212c, 214c, 212d, 214d, 312a, 314a, 312b, 314b, 312c, 314c, 412a, 414a, 412b, 414b, 412c and 414c, as described throughout this disclosure. In some implementations, the first sink device is intended to indicate that amongst a pair, a group, or a plurality, of sink devices, the source device first established a wireless connection, or wireless data transfer session, with the first sink device. As a corollary, the second sink device is intended to indicate that amongst a pair, a group, or a plurality, of sink devices, the source device secondly established a wireless connection, or wireless data transfer session, with the second sink device.

At block 502, a wireless connection, or wireless data transfer, between a source device and a first sink device can be established. The first sink device can be dynamically selected from the plurality of sink devices. As described above, the first sink device and second sink device nomenclature can be used interchangeably. In other words, the dynamic selection of the first sink device from the plurality of sink devices means that a sink device was dynamically selected for wireless data transfer, and that sink device is now called the first sink device. The wireless data transfer, can be established over any suitable communication network described throughout this disclosure. In one non-limiting example, the wireless data transfer can be established using the Bluetooth communication protocol. In some implementations, the wireless data transfer, can be established after determining that the first sink device is in closer proximity to the source device than the second sink device. For example, the source device can be implemented to determine the relative distance between itself and the first sink device and the relative distance between itself and the second sink device, to dynamically select the sink device that is more proximate to the source device, and to establish a wireless data transfer with that sink device. Additionally, or alternatively, the sink devices can be implemented to determine the relative distances to the source device, to dynamically select whichever sink device is more proximate to the source device, and establish a wireless data transfer session. The term "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In some other implementations, the wireless data transfer can be established after determining that radio channel conditions between the source device and the first sink device are more favorable than radio channel conditions between the source device and the second sink device. For example, the source device can be implemented to determine if the radio channel conditions associated with the wireless data transfer with the first sink device are of higher quality, have a higher RSSI value, or experiencing less interference or attenuation, than the radio channel conditions associated with the wireless data transfer with the second sink device. In some implementations, the source device only may be able to communicate with the first sink device due to blockage, or other interference, causing disruption on the radio channel between the source device and the second sink device. Additionally, or alternatively, the sink devices can be implemented to determine which radio channel conditions are more favorable for establishing a wireless data transfer with the source device.

At block 504, audio data from the source device can be received at the first sink device. In some implementations, the first sink device can be implemented to process the audio data. The audio data can include first data intended for the first sink device, and second data intended for the second sink device. For example, the first data can include left channel audio data intended for the first sink device, and the second data can include right channel audio data intended for the second sink device, or vice versa, depending on the left and right orientation of the first and second sink devices. In some implementations, control data can be received at the first sink device in addition to the audio data.

In some implementations, the audio data can be received by the first sink device over a broadcasted transmission from the source device. Given the nature of broadcasted transmissions, in some implementations, the audio data also can be received by the second sink device. Additionally, or alternatively, other sinks may be implemented to receive the audio data over a broadcasted transmission from the source device. For example, any sink device within range of the broadcasted transmission may be able to receive the audio data from the source device.

In some implementations, the audio data from the source device can be received by the first sink device over a single wireless communication link sent solely to the first sink device. The audio data transmitted over the single wireless communication link sent solely to the first sink device can include stereo audio data intended for both the first sink device and the second sink device. In such implementations, the source device, or the first or second sink devices, may have determined that radio channel conditions associated with the wireless data transfer to the first sink device are more favorable as compared to the radio channel conditions associated with the wireless data transfer to the second sink device. Additionally, or alternatively, the source device may have determined that a wireless data transfer to the first sink device is the only wireless data transfer available, and therefore transmitted the stereo audio data intended for both the first sink device and the second sink device over the single wireless communication link solely to the first sink device.

In some other implementations, the source device can transmit the audio data over two separate wireless communication links, with the first sink device receiving the audio data over a first wireless communication link, and the second sink device receiving the audio data over a second wireless communication link. The audio data transmitted by the source device over the two separate wireless communication links can include stereo audio data. The stereo audio data can include first data intended for the first sink device, and second data intended for the second sink device.

In some implementations, while the first sink device receives audio data from the source device, the second sink device can be configured to passively listen in on the wireless data transfer between the source device and the first sink device. For example, while the source device is transmitting stereo audio data to the first sink device, the second sink device can passively listen, monitor, eavesdrop, or otherwise sniff the stereo audio data transmission in an attempt to detect the stereo audio data intended for the second sink device, such as the right channel audio data. Upon detecting the stereo audio data intended for itself, the second sink device can be implemented to receive packets associated with the right channel audio data.

At block 506, the second data can be sent from the first sink device to the second sink device. In some implementations, the first device can send the second data to the second sink device over a magnetic communication link. For example, the first device can send the second data over an NFC, NULEF or NFMI communication link to the second sink device. In some other implementations, the first device can send the second data to the second sink device over a Bluetooth communication link.

In either implementation, the first device can send the second data to the second sink device automatically. For example, upon receiving the audio data, and optionally processing the audio data to determine the first data intended for the first sink device and the second data intended for the second sink device, the first sink device can be implemented to automatically transmit, forward, or otherwise relay the second data to the second sink device. Alternatively, in either implementation, the first device can send the second data to the second sink device in response to a request from the second sink device. For example, upon receiving the audio data, and optionally processing the audio data, the first sink device can be implemented to wait, or delay sending the second data until receiving a request from the second sink device to transmit, forward, or otherwise relay the second data to the second sink device.

While the example method 500 in FIG. 5 includes three discrete blocks, a person having ordinary skill in the art will readily recognize that other blocks can be inserted between the depicted blocks. Additionally, other blocks may be performed before or after certain depicted blocks.

Figure 6:
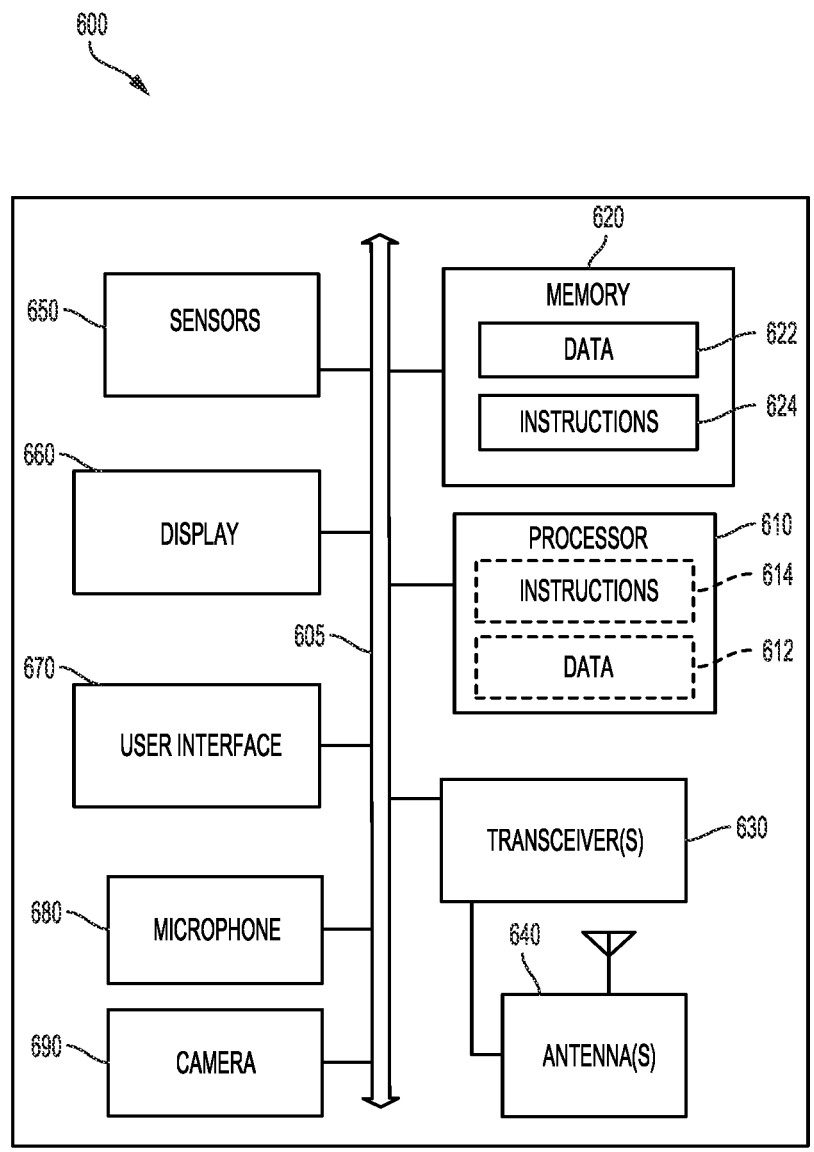
FIG. 6 shows an example source device.

FIG. 6 shows an example source device 600. The source device 600 is representative of a wide variety of electronic devices as described throughout, including and not limited to the electronic devices 102a, 102b, 202a, 202b, 202c, 202d, 302a, 302b, 302c, 402a, 402b and 402c, depicted in FIGS. 1A-4C.

The source device 600 can include a processor 610, a memory 620, at least one transceiver 630 (i.e., a transmitter and a receiver), and at least one antenna 640. The source device 600 also can include one or more sensors 650, a display 660, a user interface (UI) 670 (such as a keypad, touchscreen, voice or gesture interface), a microphone 680 (representative of a microphone and a speaker) and a camera 690. Although not depicted, the source device 600 can include one or more network interfaces, such as a wireless network interface (like a cellular interface, a Wi-Fi, or other WLAN interface, a Bluetooth® interface, a BLE interface, a WiMAX interface, a ZigBee® interface, a Wireless USB interface, etc.) or a wired network interface (like as a powerline communication interface, an Ethernet interface, etc.). In some implementations, the source device 600 may support multiple network interfaces, each of which may be configured to couple the source device 600 to a different communication network. Each of the components (or "modules") described with reference to FIG. 6 can communicate with one another, directly or indirectly, over at least one bus 605. The bus 605 may include a power bus, a control signal bus, a status signal bus, a data bus, etc. Example buses 605 can include PCI, ISA, PCI-Express, HyperTransport®, InfiniBand®, NuBus, AHB, AXI, etc.

The processor 610 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 610 may be referred to as a central processing unit (CPU). Although just a single processor 610 is depicted in the source device 600 of FIG. 6, in alternative implementations, a combination of processors (such as an ARM and DSP) including multiple processors, multiple cores, multiple nodes, or implementing multi-threading, etc., can be used.

The source device 600 also includes memory 620 in electronic communication with the processor 610 (i.e., the processor can read information from and write information to the memory 620). Memory 620 can be deemed to be in electronic communication with the processor 610 if the processor 610 can read information from or write information to the memory 620. The memory 620 may be any electronic component capable of storing electronic information. The memory 620 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 622 and instructions 624 may be stored in the memory 620. The instructions may include one or more programs, routines, sub-routines, functions, procedures, code, etc. The instructions may include a single computer-readable statement or many computer-readable statements. The instructions 624 may be executable by the processor 610 to implement the methods disclosed herein. Executing the instructions 624 may involve the use of the data 622 that is stored in the memory 620. When the processor 610 executes the instructions 624, various portions of the instructions 614 may be loaded onto the processor 610, and various pieces of data 612 may be loaded onto the processor 610.

The memory 620 also can store processor- or computer-executable software code containing instructions that, when executed, cause the processor 610 to perform various functions described herein for magnetic communication, including reception of a signal, and generation and transmission of an appropriate response signal.

The processor 610 processes information received through the transceiver 630 as well as information to be sent to the transceiver 630 for transmission through the antenna 640. Additionally, the processor 610 can process information received through one or more sensors 650 as well as information to be presented by the display 660.

In some implementations, the transceiver 630 can be implemented as both a transmitter and a receiver, and can modulate data and provide the modulated data to the antenna 640 for transmission, as well as to demodulate data received from the antenna 640. In some such implementations, the transceiver 630 can be implemented as at least one RF transmitter and at least one separate RF receiver. The transceiver 630 may communicate bi-directionally, via one or more antennas, wired, or wireless communication links as described above. For example, the transceiver 630 may represent a wireless transceiver and may communicate bi-directionally with another wireless transceiver, such as a wireless transceiver associated with the sink devices, or the earbuds 112a, 114a, 112b, 114b, 212a, 214a, 212b, 214b, 212c, 214c, 212d, 214d, 312a, 314a, 312b, 314b, 312c, 314c, 412a, 414a, 412b, 414b, 412c and 414c, depicted in FIGS. 1A-4C. The transceiver 630 also may include a modem to modulate the packets and provide the modulated packets to the antennas for transmission, and to demodulate packets received from the antennas.

The display 660 can be implemented from any suitable display technology. For example, the display 660 can be implemented from a liquid crystal display (LCD), an e-ink display, a digital microshutter (DMS) display, or an interferometric modulator (IMOD) display. Additionally, the display 660 can be implemented as a flat-panel display, such as plasma, electroluminescent (EL) displays, organic light emitting diode (OLED) display, super twisted nematic (STN) display, or thin-film transistor (TFT) LCD, or a non-flat-panel display, such as a cathode ray tube (CRT) or other tube device. The microphone 680 and the camera 690 allow the source device 600 to be suitable for engaging in voice and video communications.

Figure 7:
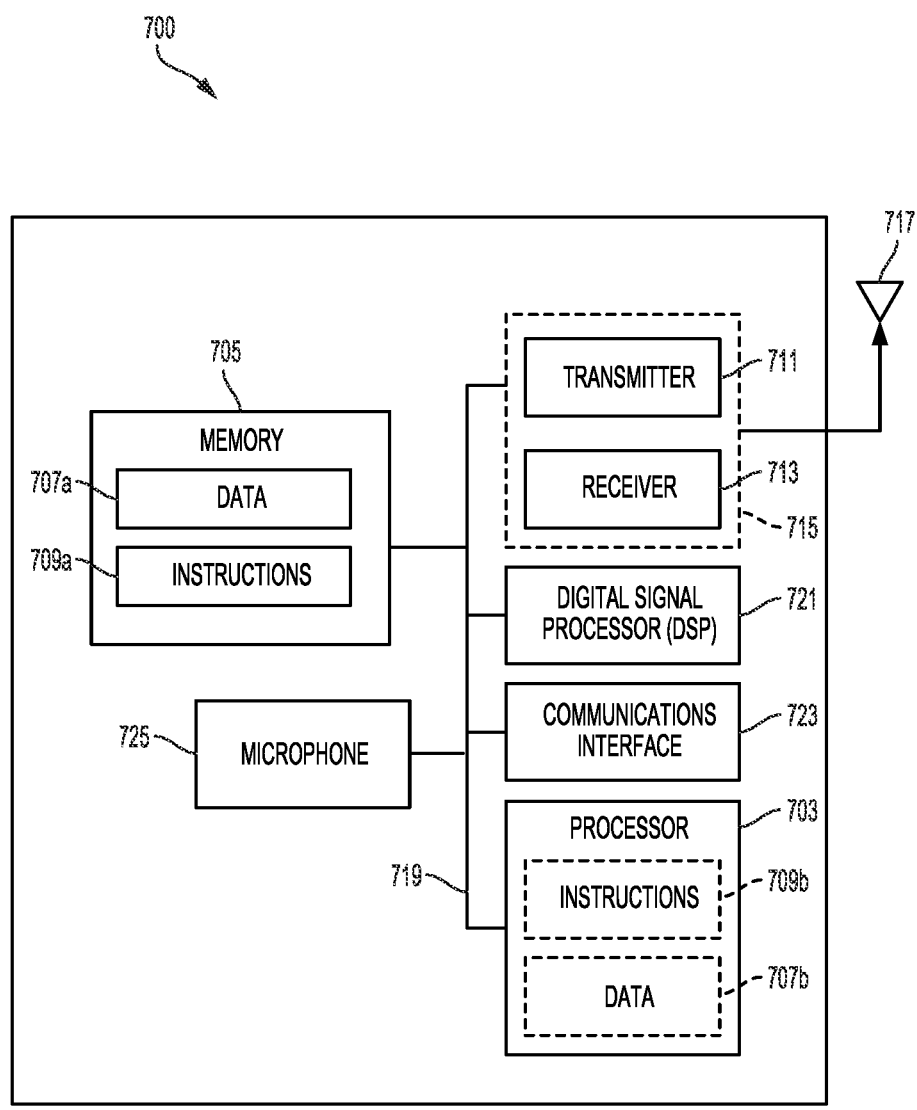
FIG. 7 shows example components that may be included within a sink device.

FIG. 7 shows example components that may be included within a sink device 700. The sink device 700 is representative of a wide variety of electronic devices as described throughout, including and not limited to the earbuds 112a, 114a, 112b, 114b, 212a, 214a, 212b, 214b, 212c, 214c, 212d, 214d, 312a, 314a, 312b, 314b, 312c, 314c, 412a, 414a, 412b, 414b, 412c and 414c, described with reference to FIGS. 1A-4C.

The sink device 700 includes a processor 703. The processor 703 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 703 may be referred to as a central processing unit (CPU). Although just a single processor 703 is depicted in the sink device 700 of FIG. 7, in alternative implementations, a combination of processors (such as an ARM and DSP) including multiple processors, multiple cores, multiple nodes, or implementing multi-threading, etc., can be used.

The sink device 700 also includes memory 705 in electronic communication with the processor 703 (i.e., the processor can read information from and write information to the memory 705). The memory 705 can be deemed to be in electronic communication with the processor 703 if the processor 703 can read information from or write information to the memory 705. The memory 705 may be any electronic component capable of storing electronic information. The memory 705 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 707a and instructions 709a may be stored in the memory 705. The instructions may include one or more programs, routines, sub-routines, functions, procedures, code, etc. The instructions may include a single computer-readable statement or many computer-readable statements. The instructions 709a may be executable by the processor 703 to implement the methods disclosed herein. Executing the instructions 709a may involve the use of the data 707a that is stored in the memory 705. When the processor 703 executes the instructions 709, various portions of the instructions 709b may be loaded onto the processor 703, and various pieces of data 707b may be loaded onto the processor 703.

The memory 705 also can store processor- or computer-executable software code containing instructions that, when executed, cause the processor 703 to perform various functions described herein for magnetic communication, including reception of a signal, and generation and transmission of an appropriate response signal.

The sink device 700 also may include a transmitter 711 and a receiver 713 to allow transmission and reception of signals to and from the sink device 700 via one or more antennas 717. The transmitter 711 and receiver 713 may be collectively referred to as a transceiver 715. The transceiver 715 also may include a modem to modulate the packets and provide the modulated packets to the antennas for transmission, and to demodulate packets received from the antennas. The sink device 700 also may include (not shown) multiple transmitters, multiple antennas, multiple receivers, and multiple transceivers. For example, the transceiver 715 can be implemented as at least one RF transmitter and at least one separate RF receiver. Alternatively, the transceiver 715 can be implemented as at least one RF transmitter and receiver and at least one magnetic communication-based transmitter and receiver. The processor 703 processes information received through the transceiver 715 as well as information to be sent to the transceiver 715 for transmission through the antenna 717.

The transceiver 715 may communicate bi-directionally, via one or more antennas, wired, wireless, or magnetic communication links as described above. For example, the transceiver 715 may represent a wireless transceiver in a first sink device and may communicate with another wireless transceiver in a second sink device, such as the wireless transceivers associated with the earbuds 112a, 114a, 112b, 114b, 212a, 214a, 212b, 214b, 212c, 214c, 212d, 214d, 312a, 314a, 312b, 314b, 312c, 314c, 412a, 414a, 412b, 414*b*, 412*c* and 414*c*, described with reference to FIGS. 1A-4C. Alternatively, the transceiver 715 may represent a magnetic communication-based transceiver in a first sink device and may communicate with another magnetic communication-based transceiver in a second sink device, such as the magnetic communication-based transceivers associated with the earbuds 112*a*, 114*a*, 112*b*, 114*b*, 212*a*, 214*a*, 212*b*, 214*b*, 212*c*, 214*c*, 212*d*, 214*d*, 312*a*, 314*a*, 312*b*, 314*b*, 312*c*, 314*c*, 412*a*, 414*a*, 412*b*, 414*b*, 412*c* and 414*c*, described with reference to FIGS. 1A-4C.

The sink device 700 may include a digital signal processor (DSP) 721. The sink device 700 also may include a communications interface 723. The communications interface 723 can be implemented as a user interface (UI) (such as a keypad, touchscreen, voice or gesture interface), and may allow a user to interact with the sink device 700. The sink device 700 also may include a microphone 725 (representative of a microphone and a speaker) for playing audio data.

The various components of the sink device 700 may be coupled together by one or more buses, which may include a power bus, a control signal bus, a status signal bus, a data bus, etc. For the sake of clarity, the various buses are illustrated in FIG. 7 as a bus system 719.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system. A person having ordinary skill in the art will appreciate that various aspects also can be described as functional equivalents to the structures, materials or devices disclosed herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of communication, comprising:
   determining that a radio channel condition between a source device and a first earbud of a pair of true wireless stereo (TWS) earbuds is more favorable than a radio channel condition between the source device and a second earbud of the pair of TWS earbuds;
   receiving, at the first earbud, audio data from the source device, wherein the audio data includes first data associated with the first earbud, and second data, different from the first data, associated with the second earbud; and
   sending the second data to the second earbud.

2. The method of claim 1, wherein sending the second data to the second earbud occurs over a magnetic communication link.

3. The method of claim 2, wherein the magnetic communication link is one of a near ultra-low energy field (NULEF) communication link or near field magnetic induction (NFMI) communication link.

4. The method of claim 1, wherein sending the second data to the second earbud occurs over a Bluetooth communication link.

5. The method of claim 1, wherein sending the second data to the second earbud occurs automatically.

6. The method of claim 1, wherein sending the second data to the second earbud is in response to a request from the second earbud.

7. The method of claim 1, further comprising:
   determining that the first earbud is more proximate to the source device than the second earbud.

8. The method of claim 1, wherein, while the first earbud receives the audio data from the source device, the second earbud passively listens in on a wireless data transfer between the source device and the first earbud.

9. The method of claim 1, further comprising:
   receiving, at the second earbud, the audio data from the source device, wherein the audio data includes the first data associated with the first earbud, and the second data associated with the second earbud; and
   sending, from the second earbud, the first data to the first earbud.

10. The method of claim 9, wherein, while the second earbud receives the audio data from the source device, the first earbud passively listens in on a wireless data transfer between the source device and the second earbud.

11. The method of claim 1, wherein:
    the source device is one of a smartphone, a mobile device, a laptop computer, a tablet device, a wearable device, an Internet of Things (IoT) device, an Internet of Everything (IoE) device, an IoT hub, or an IoE hub.

12. A first true wireless stereo (TWS) earbud, comprising:
    a processor;
    memory in electronic communication with the processor; and
    instructions stored in the memory and operable, when executed by the processor, to cause the first sink device to:
       connect with a source device, wherein the connection is associated with determining that a radio channel condition between the source device and the first TWS earbud is more favorable than a radio channel condition between the source device and a second TWS earbud;
       receive audio data from the source device, wherein the audio data includes first data associated with the first TWS earbud, and second data, different from the first data, associated with the second TWS earbud; and
       send the second data to the second TWS earbud.

13. The first TWS earbud of claim 12, wherein sending the second data to the second TWS earbud occurs over a magnetic communication link.

14. The first TWS earbud of claim 13, wherein the magnetic communication link is one of a near ultra-low energy field (NULEF) communication link or near field magnetic induction (NFMI) communication link.

15. The first TWS earbud of claim 12, wherein, when the magnetic communication antenna is unavailable, the sending the second data to the second TWS earbud occurs over a Bluetooth communication link.

16. The first TWS earbud of claim 12, wherein sending the second data to the second TWS earbud occurs automatically.

17. The first TWS earbud of claim 12, wherein sending the second data to the second TWS earbud is in response to a request from the second TWS earbud.

18. The first TWS earbud of claim 12, wherein the connection is further associated with determining that the first TWS earbud is more proximate to the source device than the second TWS earbud.

* * * * *